(12) United States Patent
Bonarens et al.

(10) Patent No.: US 8,775,021 B2
(45) Date of Patent: Jul. 8, 2014

(54) METHOD FOR CALIBRATING AN ADAPTIVE CHASSIS SYSTEM

(75) Inventors: Frank Bonarens, Oberursel (DE); Heiko Charle, Ruesselsheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/484,772

(22) Filed: May 31, 2012

(65) Prior Publication Data

US 2012/0323437 A1    Dec. 20, 2012

(30) Foreign Application Priority Data

May 31, 2011    (DE) .......................... 10 2011 102 902

(51) Int. Cl.
*G06F 7/00*    (2006.01)

(52) U.S. Cl.
USPC .......................................................... 701/36

(58) Field of Classification Search
USPC ..................................................... 701/36–37
See application file for complete search history.

(56) References Cited

U.S. PATENT DOCUMENTS

| | | | |
|---|---|---|---|
| 4,034,596 A | | 7/1977 | Cargile |
| 5,396,973 A | * | 3/1995 | Schwemmer et al. ..... 188/267.1 |
| 5,531,030 A | | 7/1996 | Dale, Jr. |
| 5,814,999 A | * | 9/1998 | Elie et al. ...................... 324/662 |
| 5,964,455 A | | 10/1999 | Catanzarite et al. |
| 6,401,020 B1 | * | 6/2002 | Neumann ........................ 701/49 |
| 7,278,215 B2 | * | 10/2007 | Hara ........................... 33/203.15 |
| 7,864,309 B2 | | 1/2011 | De Sloovere et al. |
| 8,310,662 B2 | * | 11/2012 | Mehr et al. ..................... 356/121 |
| 2003/0131485 A1 | * | 7/2003 | Jahn et al. ........................ 33/193 |
| 2004/0220708 A1 | * | 11/2004 | Owen et al. ...................... 701/29 |
| 2006/0287790 A1 | * | 12/2006 | Seifert et al. .................... 701/37 |
| 2009/0171532 A1 | * | 7/2009 | Ryan et al. ....................... 701/37 |

FOREIGN PATENT DOCUMENTS

| | | |
|---|---|---|
| DE | 4014876 A1 | 11/1991 |
| DE | 3485842 T2 | 3/1995 |
| DE | 19737710 A1 | 3/1999 |
| DE | 10023622 A1 | 11/2001 |
| DE | 10238788 A1 | 3/2004 |
| DE | 102005008403 A1 | 9/2006 |
| DE | 102007002259 A1 | 7/2008 |
| EP | 0080291 A3 | 6/1983 |
| EP | 1166039 B1 | 10/2004 |
| EP | 1659364 A1 | 5/2006 |
| GB | 2365528 A | 2/2002 |
| WO | 0040429 A2 | 7/2000 |

\* cited by examiner

*Primary Examiner* — Mary Cheung
*Assistant Examiner* — Anne Mazzara
(74) *Attorney, Agent, or Firm* — Ingrassia Fisher & Lorenz, P.C.

(57) ABSTRACT

A method for calibrating an adaptive chassis system of a motor vehicle within the production process of the vehicle is provided. The vehicle has a sensor for determining the compression or rebound state of an element of the chassis system. Sensor signals of the sensor are supplied to a control unit in which a generic sensor characteristic is stored. The method includes, after the installation of the element and the sensor, detecting the sensor signals as a function of the compression and rebound state of the element during the production process and supplying the sensor signals as raw data to the control unit. A dependence of the values of the sensor signals of the sensor on a measurement value defining the compression and rebound state of the element is determined from the raw data and from the generic sensor characteristic by an algorithm deposited in the control unit.

10 Claims, 1 Drawing Sheet

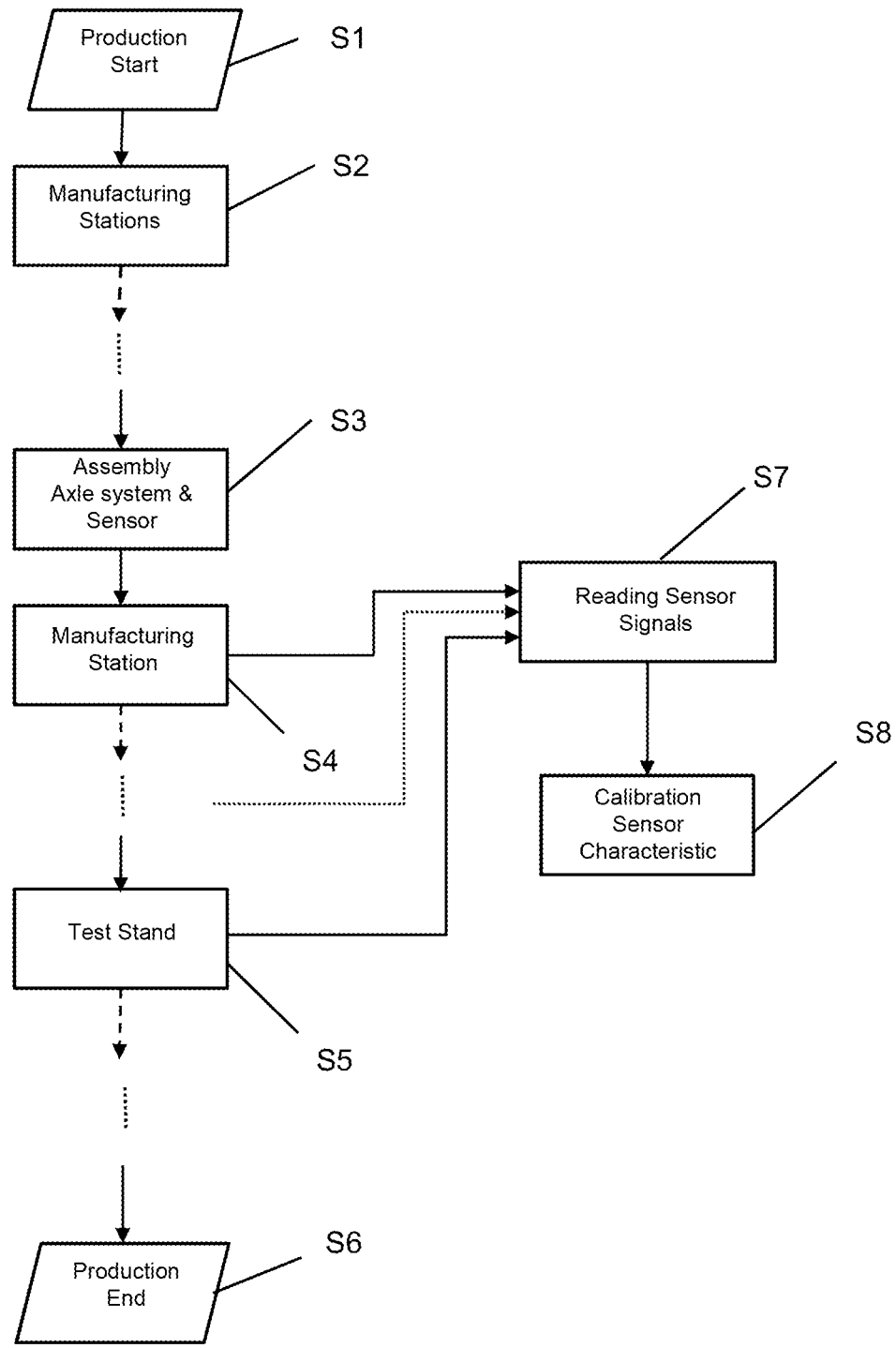

METHOD FOR CALIBRATING AN ADAPTIVE CHASSIS SYSTEM

CROSS-REFERENCE TO RELATED APPLICATION

This application claims priority to German Patent Application No. 10 2011 102 902.1, filed May 31, 2011, which is incorporated herein by reference in its entirety.

TECHNICAL FIELD

The technical field generally relates to a method for calibrating an adaptive chassis system of a motor vehicle within the manufacturing process of the motor vehicle.

BACKGROUND

Electronic systems for headlight range adjustment control or for adaptive shock absorber adjustment controls of motor vehicles require sensor systems to determine the compression or rebound status of the axle systems. Generally, sensors with linkages or inductive sensors come into use as sensor systems, which are calibrated in a vehicle status, generally in the empty state during the manufacturing process of the motor vehicle, with a so-called single point calibration. The calibration value of this single point calibration then flows as a parameter into the adjustment control software of a superordinate control unit of the motor vehicle.

The advantage of such a single point calibration consists in the rapid operability. However, such a method does not lead to the necessary accuracy over the entire measurement range of the sensor, which in particular would be necessary for a precise adjustment control, for example, within a headlight range adjustment control or damping adjustment control.

In EP 1 166 039 B1 a method is described for adjusting the axle geometry of a motor vehicle, which is able to be carried out automatically by means of robots in a fully automatic production line. For this, the vehicle with a finished assembled chassis with at least a front axle and a rear axle is adjusted, following its production in a suspended position automatically taking measurement values into consideration, wherein the measurement values are automatically detected on the wheels which are mounted on the chassis, by adjusting devices, which are constructed as lifting units, being brought up from below against the wheels in order to bring their axles into a particular compression state. This above-mentioned method for adjusting the axle geometry requires additional installation or respectively measurement devices, which lead to additional installation costs.

SUMMARY

The various embodiments herein are directed to an improved method using a single point calibration, which in particular is able to be integrated into a production process of the motor vehicle without additional installation means or measurement devices, and is able to be carried out there automatically.

Accordingly, a method is provided for calibrating an adaptive chassis system of a motor vehicle within the manufacturing process of the motor vehicle, which, for determining the compression or rebound state of an element of the adaptive chassis system, has a sensor. The sensor signals are supplied to a control unit, in which a generic sensor characteristic is stored. After the installation of the element of the adaptive chassis system and of the sensor, the sensor signals are detected as a function of the compression- and rebound state of the element of the adaptive chassis system during the subsequent production process of the motor vehicle and are supplied as raw data to the control unit. After completion of the production process of the motor vehicle, a dependence of the values of the sensor signals of the sensor on a measurement value defining the compression and rebound state of the wheel suspension is determined from the raw data and from the generic sensor characteristic by means of an algorithm deposited in the control unit.

After the installation of the sensors, on the element of the adaptive chassis system, constructed for example as an axle system, the status values of these sensors can be read, whilst the element of the adaptive chassis system is situated in various states, i.e. compression and rebound states, which occur during the further production process and therefore are known. Therefore, by means of the algorithm which is deposited in the control unit, from the sensor signals a dependence can be determined of the signal values or respectively of the signal profile of the sensor signal of the sensor and the measurement value defining the compression and rebound state of the element of the adaptive chassis system or respectively of the wheel suspension, so that by the method contemplated herein in addition to the usual single point calibration value, further calibration values can also be obtained. As these calibration values are obtained in a manner individual to the vehicle, therefore a vehicle-specific adaptation is produced of the generic sensor characteristic.

With regard to the various embodiments herein, no additional installation or testing means are required to carry it out, i.e., no additional expenditure, in particular also no additional expenditure on personnel, is necessary, because simply through the production control the control unit has to be set into a corresponding mode for the continuous detection of the sensor values.

With the recorded sensor signals, i.e. the raw data, an adaptive control system, for example a headlight range control system, can be improved or a characteristic adaptation can be carried out. These data would also be able to be used for an expanded characteristic linearization.

In an embodiment, a wheel suspension for an axle system of an adaptive shock absorber adjustment control or the axle system itself is designated as element of the adaptive chassis system. Likewise an element for the adaptive headlight range adjustment control is designated as element of the adaptive chassis system.

To determine the dependence of the values of the sensor signals of the sensor on the measurement value defining the compression and rebound state of the element of the adaptive chassis system, this element of the adaptive chassis system is set into a defined compression or rebound state. This is carried out at the end of the production process of the motor vehicle, for example at a final calibration station. Thereby, the sensor characteristic which is to be used for the field operation of the motor vehicle is generated by adaption or offset correction of the generic sensor characteristic by means of the sensor signals which are generated by the sensor during the production process and detected by the control unit.

According to another embodiment, the control unit is set into a detection mode for detecting the raw data. This can take place for example through the production control of the production line, after the axle system with the wheel suspension and the sensor are installed on the vehicle.

This method can be carried out according to an embodiment when, after the installation of the axle system, for manufacturing reasons the wheel suspension temporarily assumes the state of a rebound and for determining the dependence between the signal profile of the sensor signal of the sensor and the measurement value defining the compression and rebound state of the wheel suspension from the raw signals an extreme value, indicating a rebound state, is calculated by means of the algorithm and this extreme value can be associated with the rebounded state of the wheel suspension.

Such a state of the wheel suspension, in which the wheels are rebounded, occurs at particular production or test stations of the manufacturing process, because the motor vehicle is generally transported partially suspended along the production line. Thereby, an extreme value can be calculated from the previous sensor signals, which is associated with such an axle state. Thereby, in addition at least one calibration point is available which is simple to produce.

As there are also production or test stations along a production line for motor vehicles in which the wheel suspensions of a motor vehicle undergo a defined upper load state, for example in a braking process with maximum braking force carried out with a driver in a dynamic test stand or on driving over defined road bumps, if after the installation of the axle system for manufacturing reasons the wheel suspension temporarily assumes the state of a full or partial compression, for determining the dependence between the signal profile of the sensor signal of the sensor and the measurement value defining the compression and rebound state of the wheel suspension from the raw signals an extreme value, indicating a compression state is calculated by means of the algorithm and this extreme value is associated with the fully compressed state of the wheel suspension.

If in this way during the production of the motor vehicle, after the sensors are installed onto the axle system, these two states occur, i.e., both a rebounded and also a compressed state, calibration points which are determined in such a way can also be used for the correction of a generic characteristic or for the generation of a corresponding characteristic.

In an embodiment, the method is applied when, after the installation of the axle system for manufacturing reasons, the wheel suspension temporarily assumes the state of a full compression or respectively full rebound and that the calculated extreme value is associated with the fully compressed state of the wheel suspension. However, in an embodiment, the method is applied upon a merely partial compression or respectively with a merely partial rebound.

Finally, according to a further embodiment, by the determined dependence between the values of the sensor signal of the sensor and the measurement value defining the compression and rebound state of the wheel suspension, a correction is carried out in the sense of an adaption of the offset correction of a sensor characteristic which is stored in the control unit.

The above embodiments and further developments can be combined with one another as desired, in so far as expedient. Further possible embodiments, further developments and implementations also comprise combinations, not explicitly mentioned, of features described previously or in the following with respect to the example embodiments. In particular here the specialist in the art will also add individual aspects as improvements or supplements to the respective basic form of the various embodiments.

BRIEF DESCRIPTION OF THE DRAWINGS

The various embodiments will hereinafter be described in conjunction with the following drawing figures, wherein like numerals denote like elements, and wherein:

FIG. 1 is a diagrammatic production sequence on a production line for motor vehicles as an example embodiment of the method.

DETAILED DESCRIPTION

The following detailed description is merely exemplary in nature and is not intended to limit the various embodiments or the application and uses thereof. Furthermore, there is no intention to be bound by any theory presented in the preceding background and summary or the following detailed description.

FIG. 1 shows a diagrammatic production line, by which motor vehicles are assembled and tested along production- and test stations S1 to S7.

At a production station S3 (several stations may also be provided) an axle system and associated sensors are installed as compression sensors. An axle system comprises one or more wheel suspension, brakes, suspension and damping, a wheel carrier and the wheels installed with tires.

Subsequently, a superordinate control unit of the motor vehicle, for example, a control unit for the headlight range adjustment control, or a damping adjustment control, is set into a special mode by a production control, in which this control unit can read the values of the sensor signal of the sensor continuously during the subsequent production process. A generic sensor characteristic is deposited in the control unit, which was determined in advance specifically to the model on a test stand and is used for all vehicles of the same model.

As the wheel suspension of the axle system is situated in different compression and rebound states during the continuation of the assembly and the testing of the motor vehicle at subsequent production stations S4 and test stations S5 up to the end S6 of the production process, the associated sensor values of the sensor signal are detected continuously as raw data according to process step S7 by this superordinate control unit and are evaluated by an evaluation algorithm deposited in this control unit.

The evaluation of this raw data by the algorithm according to process step S8 takes place at the end S6 of the production process in a final calibration station, in which the wheel suspension of the axle system of the motor vehicle is set into a defined compression or rebound state and in the control unit the related sensor value is associated with this defined state. The sensor signals which have been detected hitherto, which are present for example as PWM signals, are converted in the control unit into a corresponding measurement value, for example into a height or angle specification and a correlation is provided between the values of the sensor signals or respectively the signal profile of the sensor signal of the sensor and the measurement value defining the compression and rebound state of the wheel suspension, so that thereby the generic sensor characteristic can be adapted or an offset correction can be carried out. All motor vehicle systems whose functional capability depends on this measurement value, i.e., for example a headlight range adjustment control of an adaptive shock absorber adjustment control, access the sensor characteristic which is produced in such a way.

As there are production stations or transportation routes between production stations at which the motor vehicles are mounted or transported when suspended, or situations occur in which the motor vehicles are reloaded by means of lift truck vehicles, so that thereby the wheel suspensions of the motor vehicle come into a fully rebounded state, in the evaluation of the sensor signals according to process step S9, the superordinate control unit can calculate from these sensor signals by means of the algorithm a corresponding extreme value, i.e. which indicates a rebound state, and can associate this value with the state of the fully rebounded wheel suspension.

As the motor vehicle also comes into states during assembly in which the wheel suspension is in a fully compressed state, proceedings can be carried out accordingly. By means of the superordinate control unit, the corresponding extreme value, i.e., indicating a compression state, is again calculated from the raw data by the algorithm and this value is associated with the state of the fully compressed wheel suspension. Such states of the axle system occur for example when a braking process is carried out with maximum braking speed on a dynamic test stand with a motor vehicle occupied by a driver, or when the motor vehicle is driven by a driver over defined road bumps.

These calibration points concerning the extreme values, which therefore indicate the fully compressed and rebounded state of the wheel suspension, are determined at the end of the production process, i.e., in the final calibration station S7. It is not necessary to additionally deposit in the control unit the information at which production stations or test stands these two states of the wheel suspension are present; the method therefore does not require a coupling with the production plant.

Such a sensor characteristic which is adapted or corrected with these vehicle-specific calibration values leads to an improved adjustment control for example of a headlight range adjustment control. This information can also be used for an improved fault diagnosis during the production of the motor vehicle and for an extended status detection in the subsequent driving operation.

Thus, for example, by limit values adapted to the specific motor vehicle which therefore indicate a fully compressed or a fully rebounded state, particular states of the motor vehicle can be detected, such as for example an impact onto a shock absorber buffer or a fully rebounded state.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A method for calibrating an adaptive chassis system of a motor vehicle within a production process of the motor vehicle, wherein the motor vehicle has a sensor for determining a compression or rebound state of an element of the adaptive chassis system, and wherein sensor signals of the sensor are supplied to a control unit in which a generic sensor characteristic is stored, the method comprising the steps of:
after an installation of the element of the adaptive chassis system and of the sensor, detecting the sensor signals as a function of the compression and the rebound state of the element of the adaptive chassis system at least partially during the production process of the motor vehicle prior to test stations and supplying the sensor signals as raw data to the control unit; and
after completion of the production process of the motor vehicle, determining a dependence of values of the sensor signals to measurement values defining the compression and the rebound state of the element from the raw data and from the generic sensor characteristic by an algorithm deposited in the control unit.

2. The method according to claim 1, further comprising designating as the element of the adaptive chassis system a wheel suspension for an axle system of an adaptive shock absorber adjustment control or an axle system itself.

3. The method according to claim 1, further comprising designating as the element of the adaptive chassis system an adaptive headlight range adjustment control.

4. The method according to claim 1, wherein determining the dependence of the values of the sensor signals of the sensor on the measurement value defining the compression and the rebound state of the element of the adaptive chassis system comprises setting the element of the adaptive chassis system into a defined compression or a defined rebound state.

5. The method according to claim 1, further comprising setting the control unit for detecting the raw data in a detection mode.

6. The method according to claim 1,
wherein
after assembly of the adaptive chassis system, the element of the adaptive chassis system temporarily assumes the rebound state and, for determining the dependence between the values of the sensor signals of the sensor and the measurement value defining the compression and the rebound state of the element of the adaptive chassis system, an extreme value indicating the rebound state is calculated from raw signals by the algorithm and the extreme value is associated with the rebound state of the element.

7. The method according to claim 6,
wherein
after the assembly of the adaptive chassis system, the element temporarily assumes a state of a full rebound and that the extreme value is associated with a fully rebounded state of the element.

8. The method according to claim 1,
wherein
after assembly of the adaptive chassis system, the element of the adaptive chassis system temporarily assumes the compression state and, for determining the dependence between the values of the sensor signals of the sensor and the measurement value defining the compression and the rebound state of the element of the adaptive chassis system, an extreme value indicating a compression state is calculated from raw signals by the algorithm and the extreme value is associated with a compressed state of the element.

9. The method according to claims 8,
wherein
after the assembly of the adaptive chassis system, the element temporarily assumes a state of a full compression and the extreme value is associated with a fully compressed state of the element.

10. The method according to claim 1,
wherein
a correction of the generic sensor characteristic is carried out by determining the dependence between the values of the sensor signals of the sensor and the measurement value defining the compression and the rebound state of the element of the adaptive chassis system.

\* \* \* \* \*